April 11, 1950  O. P. DOWELL  2,503,326
DEVICE FOR PARTITIONING A BASKET INTO COMPARTMENTS FOR
PACKING DIFFERENT KINDS OR DIFFERENT COLORS OF FRUITS
Filed March 24, 1949
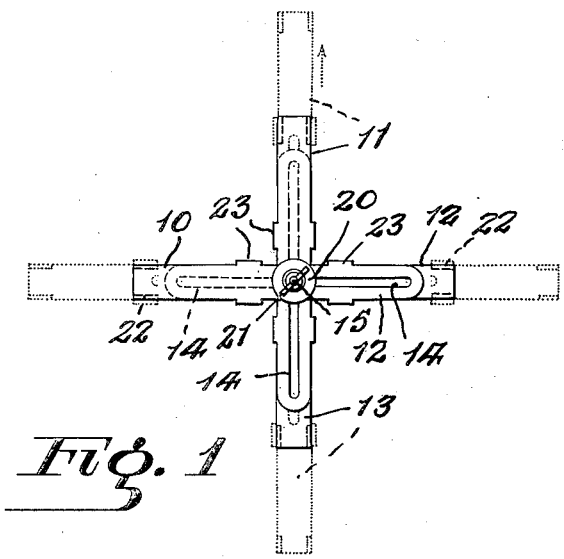
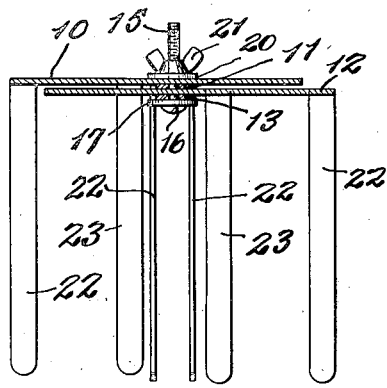
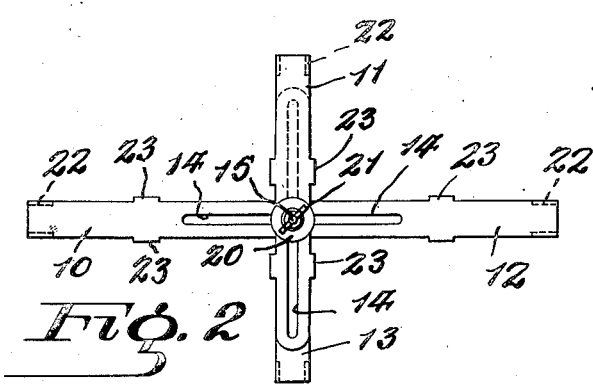
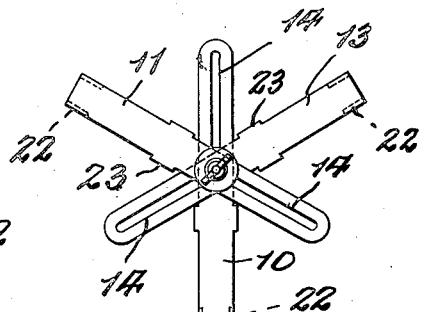
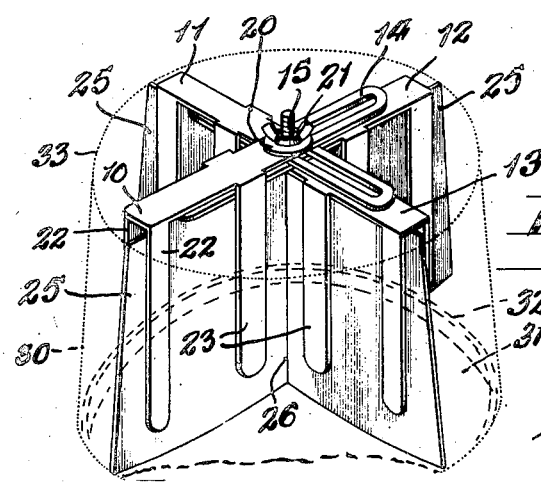
INVENTOR,
Oren Patrick Dowell
BY
Christian L. Nielsen
ATTORNEY Patented Apr. 11, 1950

2,503,326

UNITED STATES PATENT OFFICE 2,503,326

DEVICE FOR PARTITIONING A BASKET INTO COMPARTMENTS FOR PACKING DIFFERENT KINDS OR DIFFERENT COLORS OF FRUITS

Oren P. Dowell, Lawrenceville, Ill.

Application March 24, 1949, Serial No. 83,168

4 Claims. (Cl. 226—17)

This invention relates to a partitioning device for packing fruits, vegetables, and similar commodities in baskets or containers.

An object of the invention is the provision of a device for partitioning a basket or the like into two or more compartments for a more artistic display of fruits or the like when the fruit or fruits are packed into the basket, the partitioning device including a collapsible and adjustable frame for retaining a plurality of partitions in the basket to form compartments, said partitions being hinged together as a unit and adapted to be collapsed for storage.

Another object of the invention is the provision of a device for partitioning a fruit basket into two or more compartments for packing different kinds of fruits or a fruit of different colors, and making each kind or color readily accessible, the partitioning device including a metallic frame having adjustable and collapsible members for retaining a plurality of partitions hinged together along the inner vertical edges, the members of the frame having spaced depending fingers to receive and support the partitions temporarily when the fruit is being packed into the basket.

A further object of the invention is the provision of a device for partitioning a fruit basket or container into two or more compartments for a more artistic display of fruits when the fruit or fruits are packed into the basket, said device combines a removable frame with swingable wings or partitions which are hinged along a central vertical line so that certain of the wings may be collapsed on other wings, to divide the basket into two, three or more compartments, the frame having spaced rigid members for retaining temporarily the wings in place during packing, the wing-supporting elements of the frame adapted to be adjusted and fixed in place to conform to the positions of the wings.

The invention is best understood from a consideration of the detailed description in connection with the accompanying drawings, forming part of the specification, nevertheless, it must be borne in mind that the invention is not confined to the disclosure, but is susceptible of such changes and modifications as shall define no material departure from the salient feature of the invention as expressed in the appended claims.

In the drawings:

Figure 1 is a plan view of an adjustable frame for retaining wings or partitions in position in a fruit basket and dividing the basket into four compartments.

Figure 2 is a plan view of a modified form of an adjustable frame for a rectangular fruit box.

Figure 3 is a vertical section taken through the center of the frame shown in Figure 1.

Figure 4 is a plan view of the frame adjusted for partitioning a fruit basket into three compartments.

Figure 5 is a plan view of the frame shown in Figure 1 with half the number of adjustable elements removed to divide a fruit basket into two compartments.

Figure 6 is a view in perspective of the frame shown in Figure 1 with four wings or partitions hinged together centrally and held in place by the frame.

Referring more particularly to the drawings, 10, 11, 12 and 13 designate four radial arms of a metallic frame. Each arm has a longitudinal slot 14 in one end and said slot extends for approximately one half the length of the arm. A threaded bolt 15 is received by the slots in the arms with a head 16 and a washer 17 bearing against the under face of the lowest or innermost arm as the arms are arranged in superimposed relation. A washer 20 is received by the bolt 15 and a wing nut 21 screwed onto the bolt draws the arms into rigid contact with each other after said arms have been adjusted.

A pair of spaced supporting members 22 projects downwardly in integral formation with the side edges of each arm 10 to 13 inclusive, at the outer end thereof. A second pair of spaced fingers or supporting members 23 projects downwardly from each side edge of an arm adjacent the inner end thereof. These fingers are formed integrally with the respective arms. It will be noted that the fingers are connected to that portion of the arms which is opposite to the slotted portion. The frame is removable from the packed apples as will be explained presently.

Wings or partitions 25 are connected hingedly together along the inner side edges in a vertical line 26 passing through the longitudinal axis of the bolt 15. The wings are preferably made of a cheap material, such as thin cardboard, and remain in the basket when the fruit is shipped or displayed. The wings or partitions divide the basket into compartments which are filled with fruits of different colors or different kinds. The partitions which are joined together to form an insertible unit are held in place by the pairs of spaced fingers 22 and 23 on the various arms 10 to 13 inclusive.

The fruits are packed first in a liner 30 which is frusto-conical in shape and has the opposite ends thereof open. The wider open end is placed on a circular metal plate 31 provided with an annular upstanding flange 32 which embraces the lower open end of the liner 30. The flanged plate 31 is well known in the art and forms no part of the present invention.

The unit comprising the hinged partitions 25 is placed within the liner 30 and the partitions are moved at right angles to each other. The frame shown in Figures 1 and 6 has the arms 10 and 12 in longitudinal alignment and in partial overlapped relation and at right angles to the overlapped and aligned arms 11 and 13. The wing nut 21 retains the arms in the above described relation. The spaced parallel pairs of fingers 22 and 23 receive the aligned partitions and retain said partitions in position when the frame is inserted downwardly into the liner 30. The liner with the four compartments is now ready for packing.

Fruits of one color are placed in alternate or diametrically disposed compartments while a different colored fruit, such as apples, is packed into the other compartment in an orderly manner. When citrus fruits are employed, one of one kind of fruit may be packed in alternate compartments, while another kind of citrus fruit may be packed in the remaining compartments.

When the liner 30 has been completely packed, the metal frame is withdrawn through the narrower open end 33 leaving the partitions in the line 30. A basket (not shown) is placed over the liner and pressed downwardly until the basket has neatly received said liner. The basket and confined liner are turned over while the plate 31 is held in place in a well known manner.

In Figure 4, one of the arms, such as the one indicated by the numeral 12 has been removed and the three remaining arms are arranged 120° apart to divide the basket into three compartments together with the unit comprising of the partitions. However, two partitions are brought together in flat contact to form one partition to be received by the pairs of spaced fingers 22 and 23 of one arm while the other two partitions are each received by the pairs of spaced fingers of the other two arms.

In Figure 5 is shown a further modification of the frame for dividing the basket in conjunction with the partitions 25 into two compartments. In this case only the arms 11 and 13 are employed. Pairs of the partitions are placed in flat contact with each other and are received by the diagonally disposed pairs of fingers.

The frame shown in Figure 2 is used for packing rectangularly shaped boxes, and in this instance, the arms 10 and 12 have been extended so as to accommodate the length of the box while arms 11 and 13 have been adjusted for the width of the box. The liner employed of course will be of rectangular form rather than frusto-conical shape as first described.

As shown in Figure 1, the frame may be employed in baskets of varying sizes. In other words, due to the slots 14 in the arms, said arms may be adjusted in pairs towards or away from each other so that frames may be neatly fitted in the shipping containers whether they be a box, a half-bushel basket, or a bushel basket. The threaded bolt 15 and the nut 21 will not only permit such adjustment but will retain the adjustment.

What I claim:

1. An arrangement for packing fruits and the like in separate compartments in a container liner comprising a compartment-forming unit including partitions having the inner edges hinged together at the vertical center of the container, and a removable frame having pairs of spaced parallel depending fingers engaging opposite faces of the partitions for maintaining said partitions in position within the liner, arms forming the main body of the frame and carrying the fingers, pairs of the arms being in superimposed relation, means removably connecting the pairs of arms in fixed angular positions.

2. An arrangement for packing fruits and the like in separate compartments in a container liner comprising a compartment-forming unit including partitions having the inner edges hinged together at the vertical center of the container, a removable frame composed of pairs of radially disposed arms in overlapping relation, the arms in each pair being adjustable longitudinally on each other, pairs of spaced parallel fingers depending from each arm and engaging opposite faces of the partitions for maintaining said partitions upright, and means securing the pairs of arms in predetermined angular relations and the arms of each pair in adjusted positions longitudinally of each other.

3. An arrangement for packing fruits and the like in separate compartments in a container liner comprising a compartment-forming unit including partitions having the inner edges hinged together at the vertical center of the container, a removable frame for retaining the partitions in place composed of pairs of radially arranged arms, the arms in each pair having aligned longitudinal slots, means received by the slots in the pairs of arms for binding the pairs of arms in predetermined angular relations and for binding the arms in each pair to each other after said arms have been adjusted longitudinally on each other, and pairs of spaced fingers depending from each arm to receive the adjacently disposed partitions.

4. An arrangement for packing fruits and the like in separate compartments in a container liner comprising a compartment-forming unit including partitions having the inner edges hinged together at the vertical center of the container, and a removable frame having pairs of spaced parallel depending fingers engaging opposite faces of the partitions for maintaining said partitions in position within the liner, arms forming the main body of the frame and carrying the fingers, pairs of the arms being in superimposed relation, means removably connecting the pairs of arms in fixed angular positions, any number of the arms being removable for reducing the number of compartments, certain of the partitions being foldable in pairs in flat contact and received by the depending fingers on an arm to reduce the number of compartments formed in the container.

OREN P. DOWELL.

REFERENCES CITED

The following references are of record in the file of this patent:

UNITED STATES PATENTS

| Number | Name | Date |
|---|---|---|
| 1,912,505 | Weston | June 6, 1933 |
| 2,145,106 | Anderson | Jan. 24, 1939 |